May 4, 1965    A. N. KARAVIAS    3,182,154
THERMOSTATIC ELEMENT INCLUDING A PAIR OF BOWED BIMETALLIC
ELEMENTS AND A THERMODILATABLE ELEMENT
Filed Sept. 18, 1962    2 Sheets-Sheet 1

INVENTOR.
Alexander Nicolas Karavias,
BY Robert E. Burns

United States Patent Office 3,182,154
Patented May 4, 1965

3,182,154
THERMOSTATIC ELEMENT INCLUDING A PAIR OF BOWED BIMETALLIC ELEMENTS AND A THERMODILATABLE ELEMENT
Alexander Nicolas Karavias, 21a Aristotelous St., Athens 103, Greece
Filed Sept. 18, 1962, Ser. No. 224,331
Claims priority, application Greece, Sept. 23, 1961, 24,383; Dec. 7, 1961, 24,701
11 Claims. (Cl. 200—122)

This invention relates to a highly accurate and simplified thermostat.

The mathematic function curve of the thermostats in use is a well-known exponential curve of the natural Napier's logarithms, known as the cooling curve of Newton.

Taking in consideration, that the heat transfer from the heating source to a body to be heated needs to be effected necessarily through another intermediate body, consisting of a metal and also from an insulating body, the temperature of the heating source must always be higher than the temperature of the body to be heated owing to the earlier natural cooling of the heating source, as the same is warmer, and the lower natural cooling of the body to be heated, the latter being colder, there results an elevation of the temperature of the body to be heated, manifested after the interruption of the supply of the electric energy to the heating source. The temperature of the body to be heated, after the passing of some period of time, variable under the circumstances, begins gradually to be lower from the already reached highest point, according to an inverse exponential curve, and, passing through the point of the wanted constant temperature arrives at the lower point, from which begins again the supply of the electric current to the heating source, by means of the thermostat.

Previous efforts of the technicians, concerning thermostats, tended, always, through various methods more or less complicated, i.e. photo cells, amplifiers, short waves, etc., to reduce to the utmost, the extent of the temperature difference of cooling only, whereas the reducing of the elevation of the temperature more than the wanted point, which constitutes another defect, is physically impossible. In other words, the technicians' efforts were confined to only one of the two said defects of the thermostats, in use, i.e. that of the fall of the temperature under the wanted value, whereas for the other defect, concerning the temperature's oscillations over its wanted value, the problem remained unsolved.

This last problem, i.e. the full elimination of any oscillation of the temperature of the body to be heated in conformity with the general physical principle according to which the temperature, only when oscillated, is constantly stable, is the purpose of the present thermostat.

Figure 1:
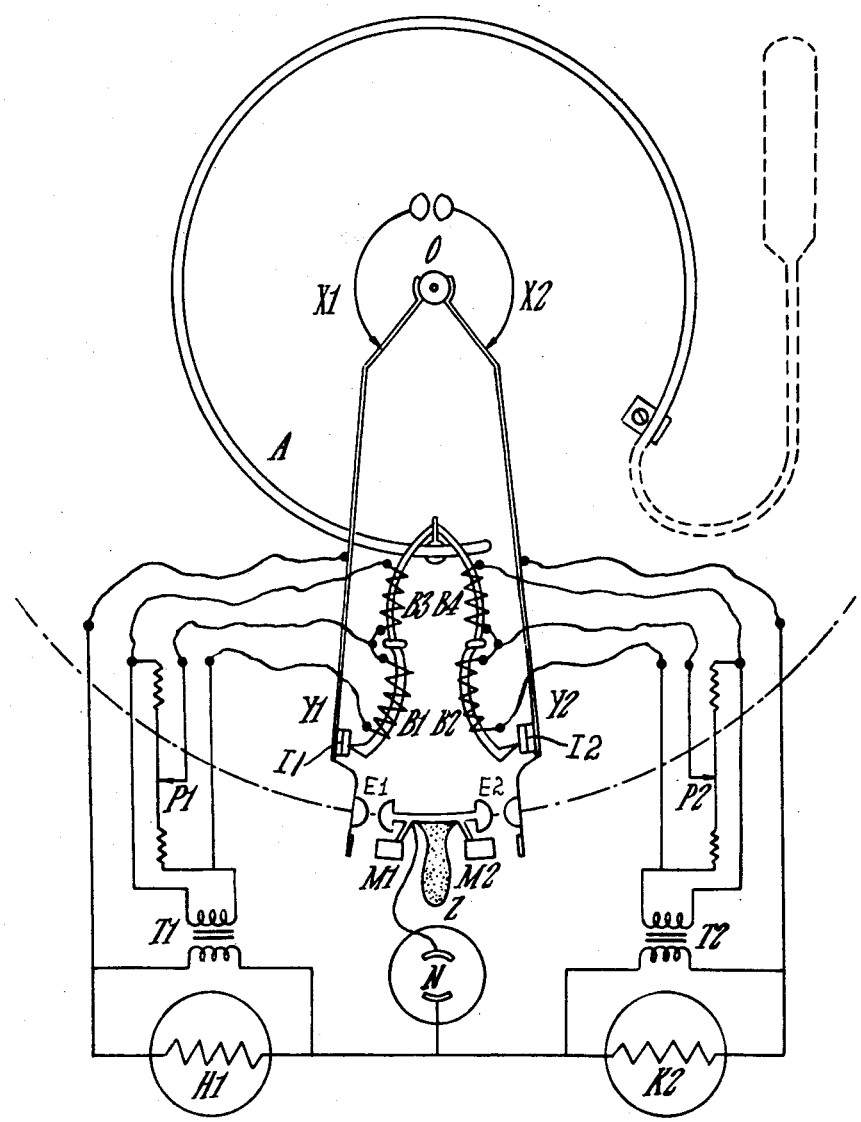
Figure 2:
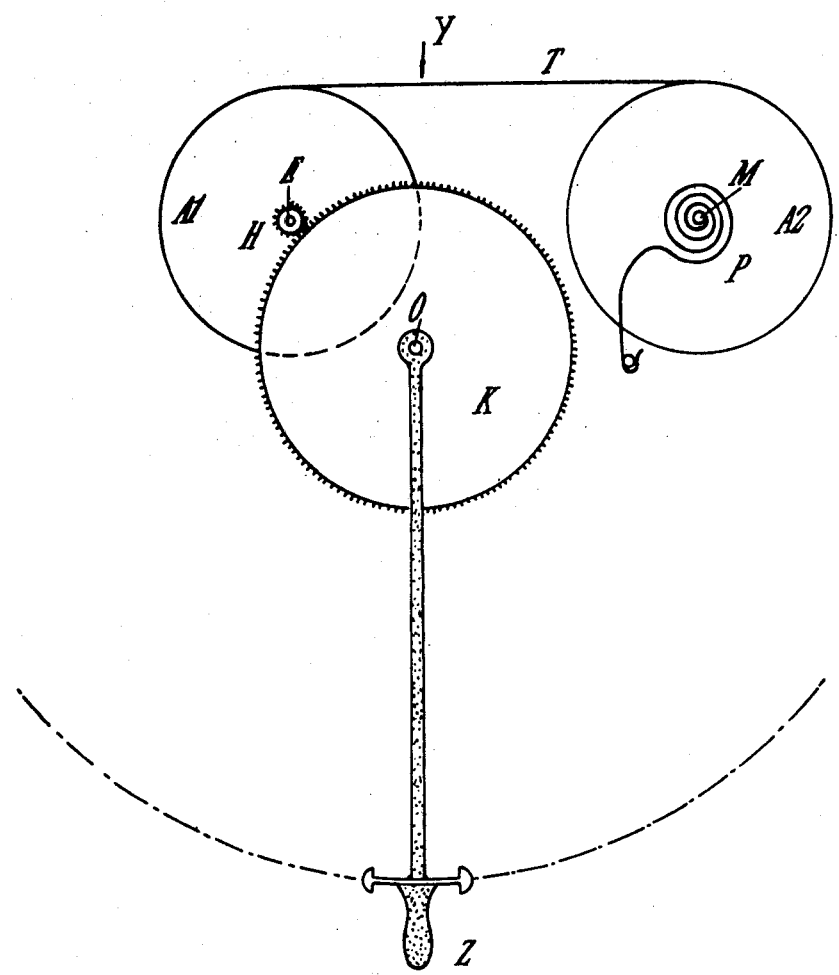

The objects and advantages of the invention will be more fully understood from the following description of a preferred embodiment illustrated in the accompanying drawings in which, FIG. 1 is a schematic view of a thermostat in accordance with the invention, and FIG. 2 is a schematic view of means for setting the thermostat very precisely.

According to the invention, as illustrated in the accompanying drawings, between the thermodilatable element A (FIG. 1) and the switch E1 or E2, are interposed two bows B1, B3 or B2, B4 constituted by strip bands of thermodilatable bimetal couple, which being heated periodically through electric current, are by the temperature automatically curved in opposite directions. These bimetal bows are provided in order to satisfy the above mentioned general physical principle, with the understanding however, that said principle of oscillations and variations of temperatures will occur in the said bows only. In this way, the desired constant temperature point is no longer between the highest and the lowest point of temperature of the exponential curve of function, as the case is of the thermostats in use, but is displaced to the highest point of the exponential curve, at which, during the change from the heating to the cooling, there is a sufficient rectilinear section of the exponential curve, of which the time duration depends on the relation of thermal capacities and of the thermal losses of the heating source as well as of the heated body.

In order however to obtain a constant temperature, the time duration of thermomechanical oscillation of the one bimetal bow, for example B1, must be always smaller than the time duration of the rectilinear section of the exponential curve, so that the temperature remains limited to the rectilinear section of the said exponential curve. In this way the temperature is retained absolutely constant.

On the other hand, it is known, that the temperature depends from the relation of the heating energy to the thermal losses, which increase in relation to the increase of the temperature. But the heating energy depends also in part on the relation of the time duration of supply to the time duration of interruption, and in part on the intensity of the electric current, which produces the heating energy.

Consequently, for any variation of the thermal losses, it is obligatory for the times of the thermo-mechanical oscillations of the bimetal bow B1, to be changed to increase or decrease the curvation limit of the same bow in proportion to the thermal losses. This, however, would have as consequence a change of place of the free movable end of the thermodilatable element A, and consequently would result in a change of value of the desired constant temperature.

In order to neutralize this improper situation, the invention provides the interposition, on the same leg, of a second bimetal bow for example B3, which, slowly curved in opposite direction towards the bow B1, compensates the needed displacement of the free movable end of the thermodilatable element A, so that the free movable end remains immovable in a position corresponding to the desired value of the constant temperature. In this way, the wanted temperature remains constant, independently of the variations of the thermal losses as well as the desired change of the value of the wanted temperature. In other words, according to the invention, the temperature remains constant at the wanted value, not through the already known method, through which the function of the thermostat is controlled by the temperature itself, but through a new method, by which the thermostat itself, by thermo-mechanical oscillations of the two bimetallic bows of each leg, in relation to the position of the free movable end of the thermodilatable element A, determines exactly the desired temperature at an absolutely stable value.

More especially the invention is characterized in possessing either one leg or two legs consisting of two series-arranged bows constituted by strip bands of thermodilatable bimetal strips adapted to be bent or curved under the effect of heat. According to particular requirements the improved thermostat is either provided with a single leg or is bipartite i.e. it comprises two legs (e.g. legs B1–B3 and B2–B4 in the drawing of FIGURE 1). The bipartite embodiment of the invention is only used as a combination for alternative heating and cooling purposes.

The operation of the thermostat is based on the variations in the oscillation of the said bows, in order to obtain the greatest possible accuracy in setting a required stable temperature—which is to be inspected at intervals—independently of variations in load and of thermal losses, by an automatic variation of both the temperature and the associated oscillations of each bimetallic bow which oscillations automatically set the relation and duration of the periodic time, of the supply and interruption of the heating and/or cooling, energy. Of the corresponding two successive bows of each leg the bows B3 and B4 are attached, through a heat and electrical insulation, to the free movable end of the thermodilatable element A, which end is moved automatically according to the variations in temperature. This element is composed either of a thermodilatable bimetallic blade bendable under the effect of heat or of a flattened curved pipe, sealed at its free movable end and communicating through its other stationary end with a chamber filled with a thermodilatable fluid.

The bows B1 and B2 are respectively attached, through neat insulating means, to the free ends of each of the first two bows B3 and B4, so as to complete their operation.

The shape, size and constituent material of these bows B1, B2, B3 and B4 and of the said thermodilatable element A may vary according to particular requirements, in some cases for example these parts may be constructed in spiral, flat, conical or cylindrical form.

The thermodilatable element A is influenced by the temperature of the main heating source constituted by the resistance H1, or that of the cooling source, constituted by the element K2.

Each of the bows B1, B2, B3 and B4 is heated individually, either by means of auxiliary electrical resistance coiled round each one of them, or in so far as both or one bow of each leg are concerned, by direct passage of the electric current through the metallic body of each bow.

The two bows of each leg when heated are individually curved in opposite directions, so that the first bows B3 and B4 of both legs, converge towards another, while the second bows B1 and B2 curved away from one another or vice versa. The electric current is conveyed to the bows by way of flexible conductors, either directly, or by means of an auxiliary transformer T1 or T2.

The two arms Y1 and Y2 are electrically insulated supported by the pivot O, and each one is moved independently as it is pressed by one of the springs X1 or X2 and thus cause the two contact-points of the two switches E1 or E2 to close.

Electric energy is supplied, through flexible conductors, from the power point N. The desired stable temperature is adjusted by setting the handle Z by hand, when displaced the latter carries with it the two inner contact-points of both the switches E1 and E2 as well as the two small magnets M1 and M2.

In the event of strong electric currents or in other cases such as, for example, the case of keeping a stable temperature on a canalization of fluids with a variable discharge, the two switches E1 and E2 energize an auxiliary electric relay controlling the supply contacts for the heating or cooling energy.

It is to be noted that the principle on which my thermostat is based, so far as heating purposes are concerned, is the operational combination of element A with the two bows of the one leg B1–B2 and as far as cooling purpose are in concern the operational combination of element A to the bows of the other leg B2– B4.

The reason for using the two first bows B3 and B4 of each leg is as follows:

In order to compensate any variation in thermal losses, the proper relation and duration, in the two tempos of setting and shutting off, of conveyed heating or cooling energy, must be automatically modified to the appropriate automatic curvation and oscillation of the bows B1 or B2 as this oscillation depends on ipso facto, its autoregularized individual mean temperature, there should be necessary a proportional propulsive displacement of the free movable end of the element A in its relative position to one of the two contact-points of each one of the switches E1 and E2 in order to duly modify the individual mean temperature of each bow.

In view of the fact however that the element A also constitutes a thermometric device, its free movable end should not be permitted to change its position for the desired stable temperature, so it is necessary for the bow B3 or B4 to be interposed, so as to accomplish the aforementioned propulsive displacement, through relative displacement of the corresponding bow B1 or B2.

Each of the two bows B3 or B4 is heated slowly either due to its greater mass or the stronger heat insulation between it and the heating electrical resistance enveloping it and, being slowly curved in the opposite direction to that of the bows B1 or B2 attached to it, transmits automatically and exactly the relative propulsive displacement each time caused by it, to the free movable end of the thermodilatable element A in relative position to the second bow, and in relation to the appropriate energy on each occasion, in order to compensate the variation of the load and the change of temperature from time to time.

The fundamental exact relation of the compensative curve and temperature corresponding to the two successive bows B1, B3 and B2, B4 of each leg is—in order to obtain this result—firmly determined and adjusted at once by means of the corresponding linear potentiometer P1 or P2.

Each of the bows B1 and B2 is quickly heated and thus quickly curved and consequently they diverge from one another, pressing more strongly, through an electric insulation 11 or 12 on the corresponding arm Y1 or Y2, until the attractive force of one of the corresponding two magnets M1 or M2 is surpassed and the corresponding switch E1 or E2 is opened suddenly. Thus the electric current is interrupted, which current feeds either the main heating source resistance H1 and the transformer T1 in case of heating or the cooling source machine K2 and the transformer T2 in case of cooling. The above bows may be also disposed in the opposite directions.

In conformity with the above arrangement and supposing for example, that the desired stable temperature is higher than the ambient temperature, the hand Z must be manually displaced to the left in a circular trajectory to a specific point corresponding to the desired stable temperature. In this way the two contacts of the switch E1 will be closed and the arm Y1 will be distended from the leg B1–B3 while at the same time the two contacts of the switch E2 will be opened, because the arm Y2 will be retained through an electrical insulation 12 by the end of the leg B2–B4. In this case the main heating source which is constituted by the resistance H1 will be heated as will also the two successive bows B1 and B3 which are curved by force of temperature in opposite direction, and when the curvature of the second bow B1 increases, this bow will approach the arm Y1. At the same time the freely movable end of the thermodilatable element A, influenced by the heat of the main heating source resistance H1, is also displaced automatically to the left (FIGURE 1) by reason of thermal expansion and by an amount corresponding to the stable temperature required. It carries with it the two legs B1–B2 and B2–B4. The free end is thus moved until the end of the bow B1 comes in contact through electric insulation 11 with the arm Y1, and presses it so as to interrupt through the switch E1 the electric current for feeding the main heating resistance H1, as well as the electric resistances of the two bows B1–B3 which are supplied with current through the transformer T1. Thus the second bow B1 which is relatively quickly cooled reduces its curvature and withdraws while the first bow B3 slowly cools, until the two contact points of the switch E1 are again closed and thus continue automatically and periodically to open and close. In this way the curvature and the temperature of the bow B3 can change little by little with each open and closed period. The curvature of the bow B3 thus being increased little by little at every opening and closing period, of the bow B1, at a frequency depending on load variations until the free movable end of the thermodilatable element A is no longer relatively displaced. The final result is that the self-regularization of the mean temperature and the mean curvature and the entailed oscillation of each bow are automatically and appropriately set at any time, determining the time span of the duration of the heating energy supplied; thus setting the desired temperature to constant levels, at any occasion in conformity with the self-regularized relation and duration between feeding span interval of interruption in the supplied energy.

For cooling the parts the corresponding even numbers will be applicable.

The improved thermostat also comprises accurate indication means which make it easy to set the exact position of the thermostat handle Z, according to the desired value of the constant temperature at any time (to an accuracy of $1/100$ of a degree). This temperature has to be kept in cases in which a certain operation must be repeated in the same temperature conditions. For instance, this happens in colored photo developments which necessitate setting the desired temperature with great accuracy to obtain the same nuances whenever desired.

The said accurate indication means—applied to the forementioned thermostat—will allow, by magnified representation of the thermostat handle Z movement, easier observation of the exact position of the handle Z, for the precise and easy determination of the exact value of the temperature desired at any time.

FIGURE 2 illustrates by way of example the abovementioned accurate indication means. This consists of the movable flexible band T on which is marked a calibrated temperature scale in degrees, these being marked in as much as possible more distant intervals in order to make easier the reading of the subdivisions. The band T is wound on two rollers A1 and A2 rotatable in clockwise and counterclockwise direction.

The roller A1 is fastened on the shaft E on which is mounted a small gear H which meshes with the large gear K, rigidly fixed on the shaft O. On this shaft O is also firmly affixed the arm of the thermostat handle Z. The roller A2 is fastened to the shaft M, about which is coiled the torsion spring P, which maintains the band T in a continuously tight condition. The two ends of this band are firmly affixed to a respective one of the two tapeholders A1 and A2. In this way if we wish to present a certain fixed temperature value (by means of which we want to develop a colored photo for example), we displace by hand, directly or through a micrometric screw, the handle Z to the corresponding exact temperature indication, in subdivisions of degree, inscribed on the band T, so that the required temperature indication lies opposite a fixed pointer Y and so, either by simple observation of the band indications, or by their lighted projection on a screen, to avoid parallax errors, the exact position of the handle Z is easily determined for the precise value of the desired temperature at any time corresponding to this position of the handle Z.

It is possible to replace two gears i.e. the small one H, as well as the large one K, by two wheels one small and one large, having a groove in their circumference and spaced apart from the other. The coupling between these wheels takes place through a flexible string or tape of which the two ends are firmly affixed to a respective one of these two wheels at a point of their groove. The tape or string is wound in a number of coils on the small wheel and in at least a partial coil on the large wheel.

As this arrangement is readily understood it is not shown on the attached drawing.

What I claim is:

1. A thermostat for maintaining a body at a constant temperature, comprising a thermodilatable element responsive to the temperature to be controlled and having a fixed portion and a portion movable in accordance with said temperature, a first elongated bimetallic element having one end fixed to said movable portion of said thermodilatable element, a second elongated bimetallic element having one end fixed to the other end of said first bimetallic element, said bimetallic elements being temperature responsive to flex in response to temperature changes and being disposed opposite to one another so as to flex in opposite directions, contacts actuatable by the free end of said second bimetallic element, and means controlled by said contacts for separately heating said first and second bimetallic elements.

2. A thermostat according to claim 1, in which said first and second bimetallic elements are thermally and electrically insulated from one another and from said thermodilatable element.

3. A thermostat according to claim 1, further comprising means for regulating the rate of heating of said bimetallic elements relative to one another.

4. A thermostat according to claim 1, in which one of said bimetallic elements is of lower specific heat so as to heat more rapidly and cool more rapidly than the other.

5. A thermostat according to claim 1, in which said contacts comprise a contact movable by said second bimetallic element and a contact which is operationally stationary but adjustable to selected position to set the temperature at which said body is to be maintained and further comprising visual indicating means comprising a movable calibrated scale and motion amplifying means operatively connecting said adjustable contact with said movable scale so that movement of said adjustable contact produces an amplified movement of said scale.

6. A thermostat for maintaining a body at a constant temperature, comprising a thermodilatable element responsive to the temperature to be controlled and having a fixed portion and a portion movable in accordance with said temperature, two pairs of elongated bimetallic elements carried by said movable portions of said thermodilatable element, each of said pairs comprising a first elongated bimetallic element having one end fixed to said movable portion of said thermodilatable element and a second elongated bimetallic element having one end fixed to the other end of said first bimetallic element, said bimetallic elements being temperature responsive to flex in response to temperature changes and the bimetallic elements of each pair being disposed in reverse relation to one another so as to flex in opposite directions, said two pairs of bimetallic elements being reversed relative to one another so that the elements of one pair flex in the opposite direction from corresponding elements of the other pair, first contacts actuatable by the free end of said second bimetallic element of one pair, means controlled by said first contacts for separately heating said first and second bimetallic elements of one pair, second contacts actuatable by the free end of said second bimetallic element of the other pair and means controlled by said second contacts for separately heating said first and second bimetallic elements of said other pair.

7. A thermostat according to claim 6, further comprising means for varying the rate of heating of said bimetallic elements of each pair relative to one another.

8. A thermostat according to claim 6, in which one of said bimetallic elements of each pair is of lower specific heat so as to heat more rapidly and cool more rapidly than the other.

9. A thermostat for maintaining a body at a constant selected temperature, comprising a pair of spaced arms movable toward and away from one another, means biasing said arms toward one another, movable electrical contacts carried by said arms, stationary contacts disposed between said arms and engageable respectively by said movable contacts, a thermodilatable element responsive to the temperature to be controlled and having a fixed end portion and a movable end portion between said arms, said movable end portion being movable in accordance with said temperature, two pairs of elongated bimetallic elements carried by said movable end portion of said thermodilatable element, each of said pairs comprising a first elongated bimetallic element, each of said pairs comprising a first elongated bimetallic element having one end fixed to said movable end portion of said thermodilatable element and a second elongated bimetallic element having one end fixed to the other end of said first bimetallic element, said bimetallic elements being temperature responsive to flex in response to temperature changes and the bimetallic elements of each pair being disposed in reverse relation to one another so as to flex in opposite directions, said two pairs of bimetallic elements being reversed relative to one another so that the elements of one pair flex in the opposite direction from the corresponding elements of the other pair, the outer free end of said second bimetallic element of one pair of said elements acting on one of said arms to disengage the movable contact carried by said arm from the corresponding stationary contact and the outer free end of said second bimetallic element of the other pair of said elements acting on the other of said arms to disengage the movable contact carried by said other arm from the corresponding stationary contact, means controlled by one of said movable contacts and the corresponding one of said stationary contacts for heating said first and second bimetallic elements of the pair of said elements acting on the arm carrying said last mentioned movable contact, and means controlled by the other of said movable and stationary contacts for heating said first and second bimetallic elements of the other of said pairs of bimetallic elements.

10. A thermostat according to claim 9, further comprising means for varying the rate of heating of said bimetallic elements of each pair relative to one another.

11. A thermostat according to claim 10, in which said stationary contacts are adjustable to select the temperature at which said body is maintained and in which means is provided for indicating the temperature for which said stationary contacts are set.

References Cited by the Examiner
UNITED STATES PATENTS

| | | | |
|---|---|---|---|
| 1,636,191 | 7/27 | McCabe | 200—140 X |
| 1,821,853 | 9/31 | Short | 200—140 X |
| 2,002,467 | 5/35 | Blodgett | 200—122 |

BERNARD A. GILHEANY, *Primary Examiner.*

ROBERT K. SCHAEFER, *Examiner.*